United States Patent
Sun et al.

(10) Patent No.: US 10,445,107 B2
(45) Date of Patent: Oct. 15, 2019

(54) SECURITY DESIGN FOR A WAKE UP FRAME

(71) Applicants: Sheng Sun, Ottawa (CA); Yan Xin, Ottawa (CA); Osama Aboul-Magd, Ottawa (CA); Jung Hoon Suh, Ottawa (CA); Kwok Shum Au, Ottawa (CA)

(72) Inventors: Sheng Sun, Ottawa (CA); Yan Xin, Ottawa (CA); Osama Aboul-Magd, Ottawa (CA); Jung Hoon Suh, Ottawa (CA); Kwok Shum Au, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 100 days.

(21) Appl. No.: 15/459,960

(22) Filed: Mar. 15, 2017

(65) Prior Publication Data

US 2018/0018185 A1     Jan. 18, 2018

Related U.S. Application Data

(60) Provisional application No. 62/362,455, filed on Jul. 14, 2016.

(51) Int. Cl.
| | | |
|---|---|---|
| *G06F 9/4401* | (2018.01) | |
| *H04W 76/11* | (2018.01) | |
| *G06F 21/44* | (2013.01) | |
| *H04W 52/02* | (2009.01) | |
| *H04W 84/12* | (2009.01) | |

(52) U.S. Cl.
CPC .......... *G06F 9/4418* (2013.01); *G06F 9/4416* (2013.01); *G06F 21/44* (2013.01); *H04W 52/0235* (2013.01); *H04W 76/11* (2018.02); *H04W 84/12* (2013.01); *Y02D 70/00* (2018.01); *Y02D 70/142* (2018.01); *Y02D 70/26* (2018.01)

(58) Field of Classification Search
CPC ...... G06F 9/4418; G06F 9/4416; G06F 21/44; H04W 76/11; H04W 52/0235
See application file for complete search history.

(56) References Cited

U.S. PATENT DOCUMENTS

| | | |
|---|---|---|
| 6,622,251 B1 | 9/2003 | Lindskog et al. |
| 9,131,399 B2 | 9/2015 | Liu et al. |
| 9,883,473 B2 | 1/2018 | Azizi et al. |

(Continued)

FOREIGN PATENT DOCUMENTS

| | | |
|---|---|---|
| CN | 1960365 A | 5/2007 |
| CN | 101087220 A | 12/2007 |

(Continued)

OTHER PUBLICATIONS

AMD, Magic Packet Technology, Nov. 1995, AMD (Year: 1995).*

(Continued)

*Primary Examiner* — Austin Hicks

(57) ABSTRACT

Methods and systems for waking up an electronic device having a wake-up receiver circuit. A signal is transmitted, carrying a wake-up frame (WUF) including a protocol data unit (PDU). A wake-up sequence is inserted in a portion ahead of the PDU. The wake-up sequence is used by the electronic device for detection of the WUF and identification of the intended recipient. The WUF also includes a wake-up identifier (WUID) that is used by the electronic device to authenticate the WUF.

20 Claims, 10 Drawing Sheets

(56) References Cited

U.S. PATENT DOCUMENTS

| | | |
|---|---|---|
| 2003/0031120 A1 | 2/2003 | Miyato et al. |
| 2004/0233973 A1 | 11/2004 | Fullerton et al. |
| 2005/0237161 A1 | 10/2005 | Lee et al. |
| 2006/0248208 A1 | 11/2006 | Walbeck et al. |
| 2007/0076683 A1 | 4/2007 | Chung et al. |
| 2007/0174916 A1* | 7/2007 | Ching ............ G06F 21/606 726/24 |
| 2007/0195911 A1 | 8/2007 | Ochi |
| 2007/0273484 A1 | 11/2007 | Cederlof et al. |
| 2008/0056219 A1 | 3/2008 | Venkatachalam |
| 2008/0122584 A1 | 5/2008 | Itasaki et al. |
| 2008/0303636 A1 | 12/2008 | Chatte et al. |
| 2009/0010191 A1 | 1/2009 | Wentink |
| 2010/0260159 A1 | 10/2010 | Zhang et al. |
| 2010/0315954 A1 | 12/2010 | Singh et al. |
| 2011/0090977 A1 | 4/2011 | Zhong |
| 2011/0122938 A1 | 5/2011 | Kameya |
| 2011/0274193 A1* | 11/2011 | Yoon ............ H04J 13/10 375/260 |
| 2012/0151028 A1 | 6/2012 | Lu et al. |
| 2012/0191995 A1 | 7/2012 | Naveh et al. |
| 2012/0281696 A1 | 11/2012 | Pohlmann et al. |
| 2012/0321006 A1 | 12/2012 | Akita et al. |
| 2013/0182795 A1 | 7/2013 | Cherian et al. |
| 2013/0223313 A1 | 8/2013 | Aboul-Magd et al. |
| 2013/0230035 A1 | 9/2013 | Grandhi et al. |
| 2013/0279382 A1 | 10/2013 | Park |
| 2013/0294431 A1 | 11/2013 | Wang et al. |
| 2014/0029511 A1 | 1/2014 | Park et al. |
| 2014/0112229 A1 | 4/2014 | Merlin et al. |
| 2014/0153460 A1 | 6/2014 | Shrivastava et al. |
| 2014/0185501 A1 | 7/2014 | Park |
| 2014/0192820 A1 | 7/2014 | Azizi |
| 2014/0208138 A1 | 7/2014 | Homchaudhuri et al. |
| 2014/0211680 A1 | 7/2014 | Seok et al. |
| 2015/0103727 A1 | 4/2015 | Zhang et al. |
| 2015/0146606 A1 | 5/2015 | Dong |
| 2015/0245290 A1 | 8/2015 | Liu |
| 2015/0382283 A1 | 12/2015 | Wang et al. |
| 2016/0007288 A1 | 1/2016 | Samardzija et al. |
| 2016/0021656 A1 | 1/2016 | Park |
| 2016/0057605 A1 | 2/2016 | Shellhammer et al. |
| 2016/0100414 A1 | 4/2016 | Guvenkaya et al. |
| 2016/0295511 A1 | 10/2016 | Qi et al. |
| 2016/0380712 A1 | 12/2016 | Levy |
| 2017/0064634 A1 | 3/2017 | Van Horn et al. |
| 2017/0111820 A1 | 4/2017 | Wang et al. |
| 2017/0111865 A1 | 4/2017 | Seok |
| 2017/0111866 A1 | 4/2017 | Park et al. |
| 2017/0134943 A1* | 5/2017 | Min ............ H04W 12/06 |
| 2017/0136992 A1 | 5/2017 | Hamada et al. |
| 2017/0295538 A1 | 10/2017 | Zhang et al. |
| 2018/0007619 A1 | 1/2018 | Zhuang et al. |
| 2018/0007629 A1 | 1/2018 | Dorrance et al. |
| 2018/0013591 A1 | 1/2018 | Shafiee et al. |
| 2018/0020397 A1 | 1/2018 | Aminaka et al. |
| 2018/0176066 A1 | 6/2018 | Lim et al. |
| 2018/0184445 A1 | 6/2018 | Larmo et al. |

FOREIGN PATENT DOCUMENTS

| | | |
|---|---|---|
| CN | 101237438 A | 8/2008 |
| CN | 103138949 A | 6/2013 |
| CN | 104272797 A | 1/2015 |
| CN | 104301973 A | 1/2015 |
| CN | 105144649 A | 12/2015 |
| CN | 105723780 A | 6/2016 |
| EP | 2843892 A1 | 3/2015 |

OTHER PUBLICATIONS

Wireshark, WakeOnLAN (WOL), Feb. 7, 2016, https://wiki.wireshark.org/WakeOnLAN (Year: 2016).*

U.S. Appl. No. 62/362,410, titled "Frame Format and Design of Wake-Up Frame for a Wake-Up Receiver", filed Jul. 14, 2016.

U.S. Appl. No. 62/362,473, titled "MAC Frame Design of Wake-Up Frame For Wake-Up Receiver", filed Jul. 14, 2016.

* cited by examiner

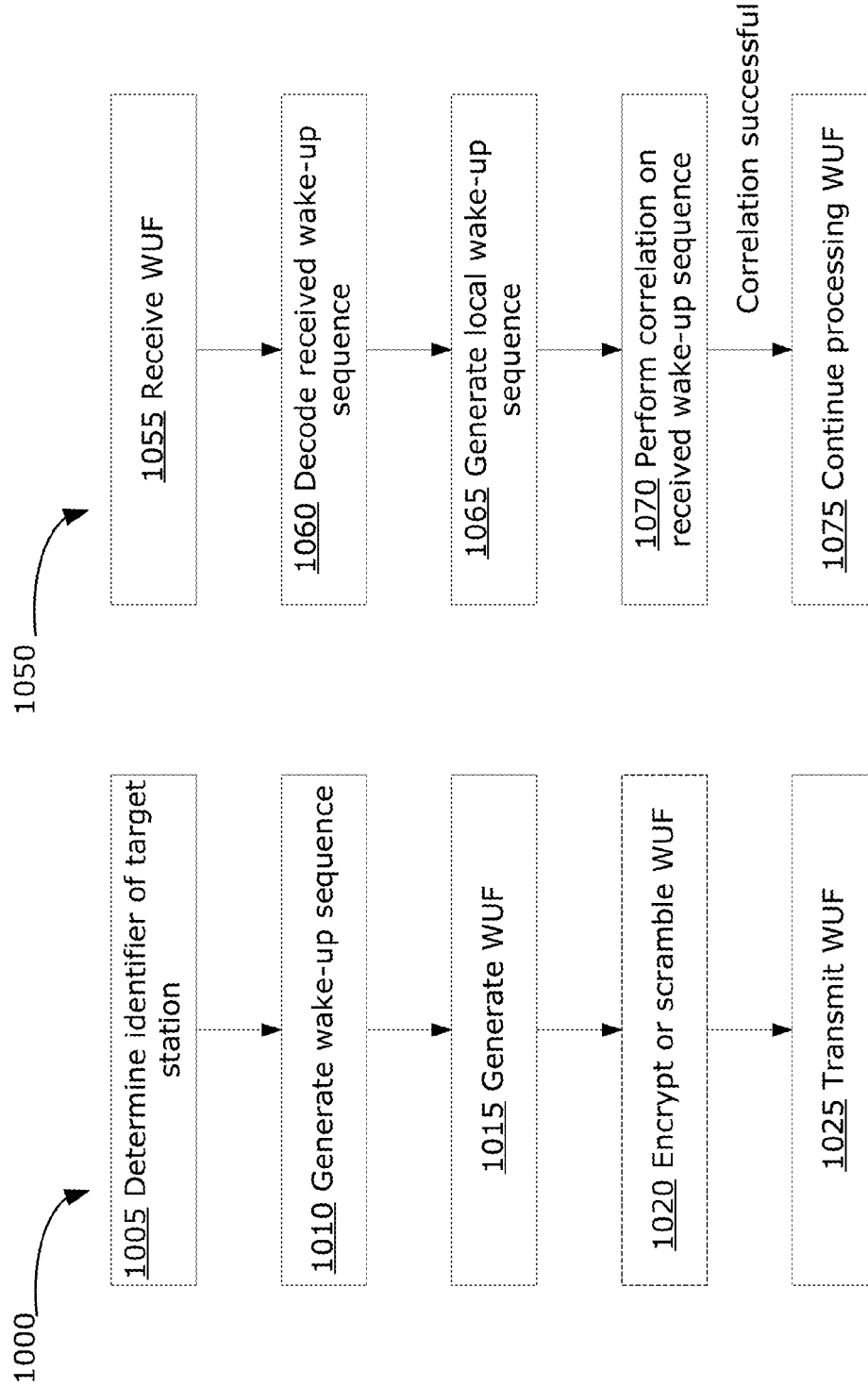

SECURITY DESIGN FOR A WAKE UP FRAME

CROSS-REFERENCE TO RELATED APPLICATION

The present application claims priority from U.S. provisional patent application No. 62/362,455, filed Jul. 14, 2016, the entirety of which is hereby incorporated by reference.

FIELD

The present application relates to methods and systems for communicating with a wake-up receiver, including providing secure communications with a wake-up receiver.

BACKGROUND

In wireless communication, efficient use of the available power is one of the main goals of system design. Often, a wireless local area network (WLAN) device, such as in Internet of Things (IoT) applications, relies on a limited power supply (e.g., as supplied by rechargeable or non-rechargeable batteries). Examples of such a device may include sensor devices located in remote fields measuring some physical phenomenon, e.g. water level or temperature; and wearable devices measuring some bodily function, e.g. pulse rate.

Such a device may be designed to operate on a low duty cycle (e.g., communicating with an access point (AP) only once per day) and thus it may not be appropriate for its main WLAN receiver circuit to be always on. The limited power supply (e.g., battery) of the device may be quickly exhausted if not provided with an appropriate sleep mode for the WLAN receiver circuit and an appropriate wake-up mechanism. A wake-up mechanism that relies on a wake-up signal from an external source may be vulnerable to malicious attacks from a third-party.

SUMMARY

A suitable wake-up frame (WUF) design is described herein for communicating wake-up signals to the WUR circuit. The present description describes example embodiments of a WUF, including a wake-up sequence, a wake-up identifier and optionally a wake-up key to protect the WUR circuit from malicious attacks.

In some aspects, the present disclosure describes a method of waking up an electronic device (ED) having a wake-up receiver circuit. The method includes transmitting a signal comprising a wake-up frame (WUF) within a physical protocol data unit (PPDU). The WUF includes a wake-up sequence inserted in a portion within the PPDU. The wake-up sequence encodes information for detection of the WUF and identification of at least one intended recipient device. The WUF further includes a wake-up identifier (WUID) in a data portion following the wake-up sequence. The WUID encodes information for authenticating the WUF.

In any of the preceding embodiments/aspects, the WUF may include a physical layer preamble (PHY preamble), and the wake-up sequence may be inserted in the PHY preamble.

In any of the preceding embodiments/aspects, the WUF may include a physical layer preamble (PHY preamble) and a physical layer header (PHY header), and the wake-up sequence may be inserted between the PHY preamble and the PHY header.

In any of the preceding embodiments/aspects, the information encoded in the WUID further may be for identifying the at least one intended recipient device.

In any of the preceding embodiments/aspects, the method may further include generating the wake-up sequence using at least a portion of a device identifier of the intended recipient device as input for a sequence generation algorithm. The sequence generation algorithm may be selected to generate sequences having good autocorrelation properties.

In any of the preceding embodiments/aspects, the sequence generation algorithm may be for generation of a Gold sequence.

In any of the preceding embodiments/aspects, at least the portion of the device identifier may be used to define a shift operator for generation of the Gold sequence.

In any of the preceding embodiments/aspects, the WUID may be generated by a source of the WUF based on a wake-up key (WUK) shared between the source and the ED.

In any of the preceding embodiments/aspects, the method may further include, after transmitting a first WUF with a first WUID generated using the WUK, using the first WUID and the same WUK to generate a second WUID for a second WUF.

In any of the preceding embodiments/aspects, the WUID may be assigned to the ED by a source of the WUF.

In any of the preceding embodiments/aspects, the method may further include encrypting at least a data portion of the WUF using a wake-up key (WUK) before transmitting the signal comprising the WUF. The WUK may be shared between a source of the WUF and the ED.

In any of the preceding embodiments/aspects, the method may further include scrambling at least a data portion of the WUF using a wake-up key (WUK) or using the WUID, before transmitting the signal comprising the WUF.

In some aspects, the present disclosure describes a method of waking up an electronic device (ED) having a wake-up receiver circuit. The method includes receiving a signal comprising a wake-up frame (WUF). The method also includes decoding a first portion of the WUF to obtain a received wake-up sequence and performing correlation on the received wake-up sequence. The method also includes, after successful correlation, decoding a second portion of the WUF to obtain a wake-up identifier (WUID) and validating authentication of the WUID. The method also includes, after successful validation, transmitting an internal signal to a main receiver circuit to wake up the ED.

In some aspects, the present disclosure describes an electronic device (ED) comprising a wake-up receiver circuit. The wake-up receiver circuit is configured to receive a signal comprising a wake-up frame (WUF). The wake-up receiver circuit is further configured to decode a first portion of the WUF to obtain a received wake-up sequence and perform correlation on the received wake-up sequence. The wake-up receiver circuit is further configured to, after successful correlation, decode a second portion of the WUF to obtain a wake-up identifier (WUID) and validating authentication of the WUID. The wake-up receiver circuit is further configured to, after successful validation, transmit an internal signal to a main receiver circuit to wake up the ED.

In any of the preceding embodiments/aspects, the method may further include decrypting at least a data portion of the WUF using a wake-up key (WUK) shared between a source of the WUF and the ED.

In any of the preceding embodiments/aspects, the method may further include unscrambling at least a data portion of the WUF using a wake-up key (WUK) or using the WUID.

In any of the preceding embodiments/aspects, performing correlation on the received wake-up sequence may include generating a local wake-up sequence; and performing correlation between the received wake-up sequence and the local wake-up sequence.

In any of the preceding embodiments/aspects, generating the local wake-up sequence may include using at least a portion of a device identifier of the ED as input for a sequence generation algorithm. The sequence generation algorithm may be selected to generate sequences having good autocorrelation properties.

In any of the preceding embodiments/aspects, the sequence generation algorithm may be for generation of a Gold sequence.

In any of the preceding embodiments/aspects, at least the portion of the device identifier may be used to define a shift operator for generation of the Gold sequence.

BRIEF DESCRIPTION OF THE DRAWINGS

Reference will now be made, by way of example, to the accompanying drawings which show example embodiments of the present application, and in which:

FIGS. 10A and 10B are flowcharts illustrating an example of generation and use of a wake-up sequence by an AP and a station, respectively.

Similar reference numerals may have been used in different figures to denote similar components.

DESCRIPTION OF EXAMPLE EMBODIMENTS

A separate low-power wake-up receiver (WUR) circuit can be provided in an Electronic Device (ED) such as a WLAN device, and more specifically a station associated with an AP. The WUR receiver circuit is generally a low-power receiver circuit (typically, a simplified or reduced version of the main wireless receiver circuit) designed for receiving and detecting a wake-up signal. The WUR circuit communicates with the WLAN receiver circuit, or other equivalent circuit, of the device, so the WLAN receiver circuit may sleep and conserve power until the WUR circuit wakes up the WLAN receiver circuit. The WUR circuit wakes up the WLAN receiver circuit, or other equivalent circuit, when the WUR circuit detects a wake-up signal from an AP (typically, the AP associated with the WLAN device). However, the communication of a wake-up signal from the AP to the station may be vulnerable to malicious attacks from a third party.

A suitable wake-up frame (WUF) design is described herein for communicating wake-up signals to the WUR circuit. The present description describes example embodiments of a WUF, including security features to protect the WUR circuit from malicious attacks. It should be noted that a WUF may also be referred to as a wake-up packet.

Example embodiments described herein may be implemented using IEEE 802.11 technology.

Figure 1:
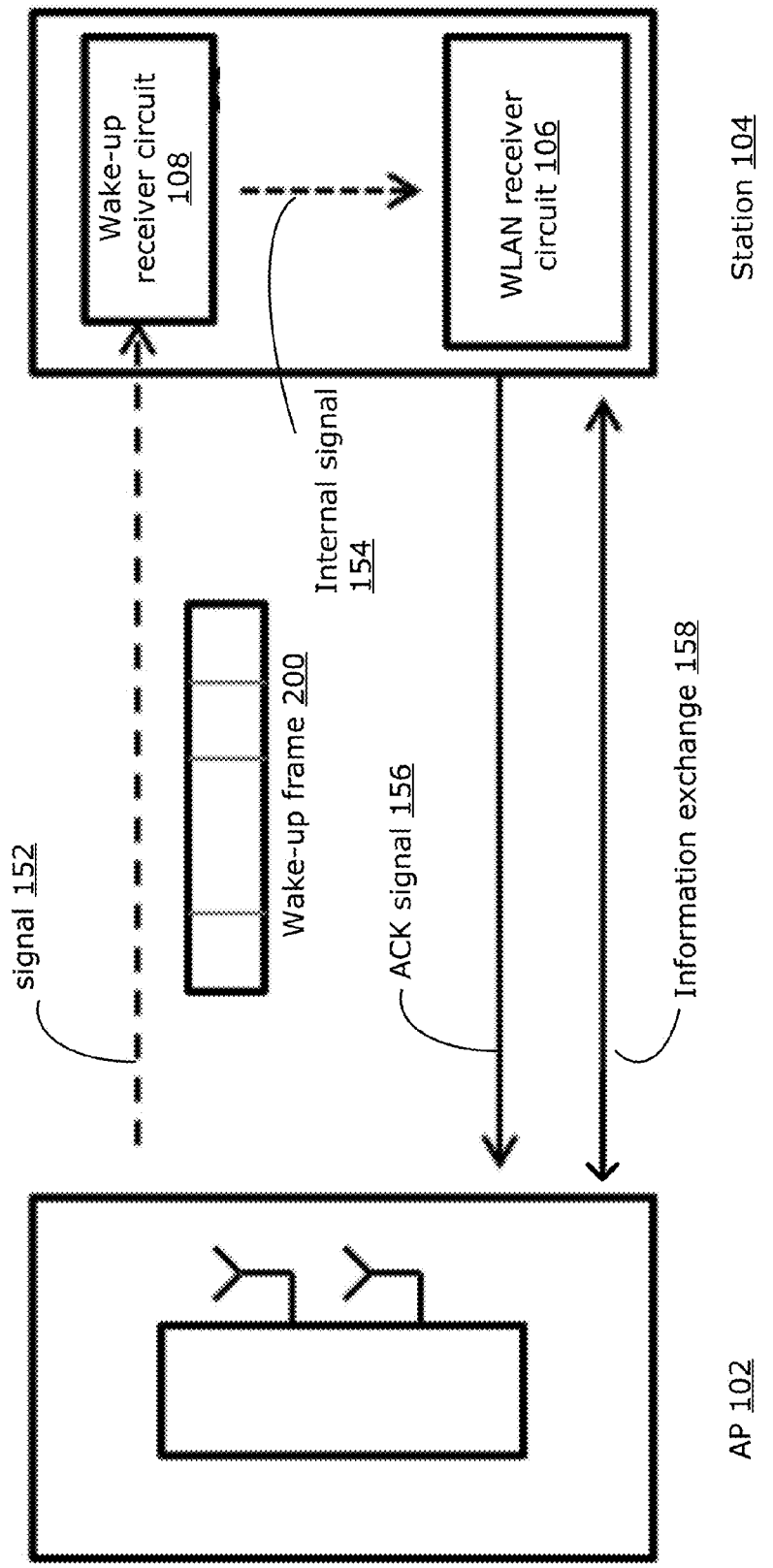
FIG. 1 is a block diagram illustrating communications between an AP and an example station having a wake-up receiver circuit.

FIG. 1 is a schematic diagram illustrating an example AP 102 and an example station 104 (e.g., a low duty cycle WLAN device or other electronic device) associated with the AP 102. The example station 104 includes a main WLAN receiver circuit 106 (e.g., a Wi-Fi receiver) and a WUR circuit 108 (also referred to simply as a WUR). While FIG. 1 shows a WLAN receiver circuit 106, the present disclosure may be applicable to other circuits, including other wireless receiver circuits, which may benefit from a wake-up mechanism.

FIG. 1 illustrates a set of example signals that may be communicated for waking up a sleeping WLAN receiver circuit 106. The AP 102 may send a signal 152, communicating a WUF 200 (described further below) to the station 104. The WUF 200 is detected by the WUR circuit 108. After decoding and validating the WUF 200 (described further below), the WUR circuit 108 sends an internal signal 154 to the WLAN receiver circuit 106, waking up the WLAN receiver circuit 106 if the WLAN receiver circuit 106 is in sleep mode. The WLAN receiver circuit 106 then sends an ACK signal 156 back to the AP 102. Appropriate information exchange 158 between the AP 102 and the station 104 (via the WLAN receiver circuit 106) may then take place. After the information exchange 158 is finished, the WLAN receiver circuit 106 may return to the sleep state. The signal 152, ACK signal 156 and information exchange 158 may all be communicated over the same channel.

Although FIG. 1 shows the AP 102 communicating with a single station 104, the AP 102 may be associated with a plurality of stations 104 and may send unicast transmissions to a specific station 104 in the group or send broadcast transmissions (e.g., using a group address) to a group of associated stations 104.

Figure 2:
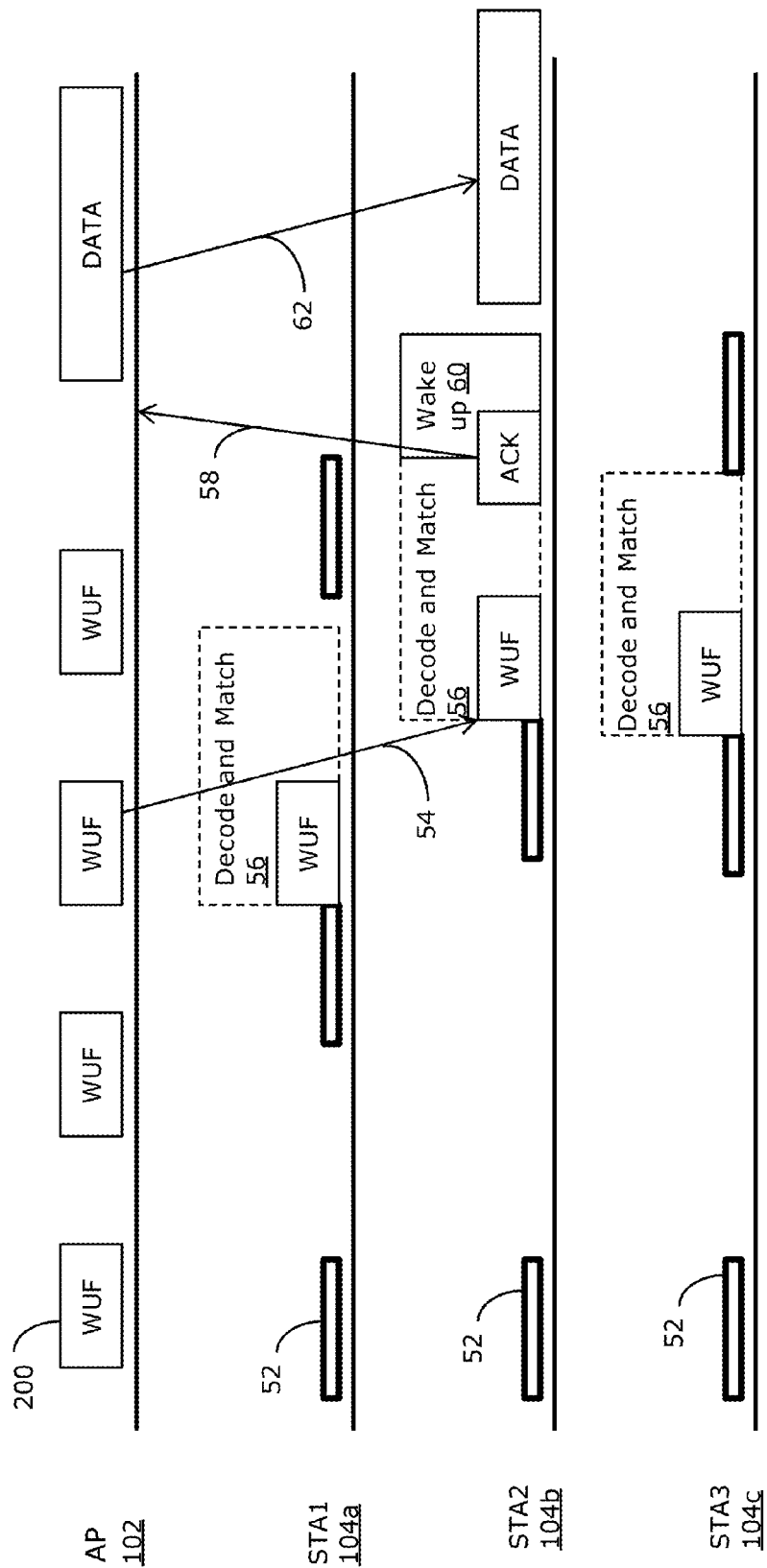
FIG. 2 illustrates an example of how a wake-up frame is communicated from an AP to a recipient station among a group of stations.

FIG. 2 illustrates an example of how an AP 102 communicates a WUF 200 to a target station 104 in a group of associated stations 104. In FIG. 2, the AP 102 is associated with three stations STA1 104a, STA2 104b and STA3 104c (collectively stations 104), although in other examples the AP 102 may be associated with more or fewer stations 104. Each station 104 listens for transmissions from the AP 102, for example using clear channel assessment (CCA).

The AP 102 transmits the WUF 200 to the associated stations 104, and continues transmitting the WUF 200 until the transmission is acknowledged or else times out. In some examples, the AP 102 may, instead of transmitting a WUF 200, transmit a conventional data frame with an inserted wake-up information element.

When each station 104 receives the WUF 200, each station 104, at 56, begins decoding the frame and matches a wake-up sequence (discussed further below) to determine whether it is the intended recipient of the WUF 200. In the example shown, STA1 104a and STA3 104c are not the intended recipient, so these stations 104a, 104c do not respond to the transmission. STA2 104b is the intended recipient and STA2 104b receives the WUF 200 at 54. STA2

104b then begins decoding the frame and determines that it is the intended recipient. In accordance with example security features discussed further below, the STA2 104b may also perform verification (e.g., using a wake-up identifier, discussed further below) to ensure the WUF 200 is from a valid source (e.g., the AP 102 and not a malicious third-party). In examples where the WUF 200 is encrypted for greater security, the STA2 104b may perform decryption on the WUF 200, for example using a wake-up key, as discussed further below. In some examples, the WUF 200 is scrambled for security, and the STA2 104b may perform descrambling on the WUF 200. Where scrambling is used, a wake-up key or wake-up identifier, both discussed further below, may be used as an initiation vector for a scrambling algorithm.

After STA2 104b determines it is the intended recipient, optionally STA2 104b at 58 may transmit an ACK signal back to the AP 102 to acknowledge receipt of the WUF 200. At 60, the WUR circuit 108 of STA2 104b wakes up the sleeping WLAN receiver circuit 106 of STA2 104b via an internal signal 154. The AP 102 may then, at 62, transmit further data to the STA2 104b to be received by the WLAN receiver circuit 106 of STA2 104b.

In some examples, the AP 102 transmits a WUF 200 intended to be received by a group of stations 104. For example, the WUF 200 may be transmitted to a group address instead of an individual station address. The communications may be similar to that described above with respect to FIG. 2, with the difference that all stations 104 included in the group address will, after appropriate validation, send acknowledgement back to the AP 102 and wake up the respective sleeping WLAN receiver circuits 106.

Figure 3:
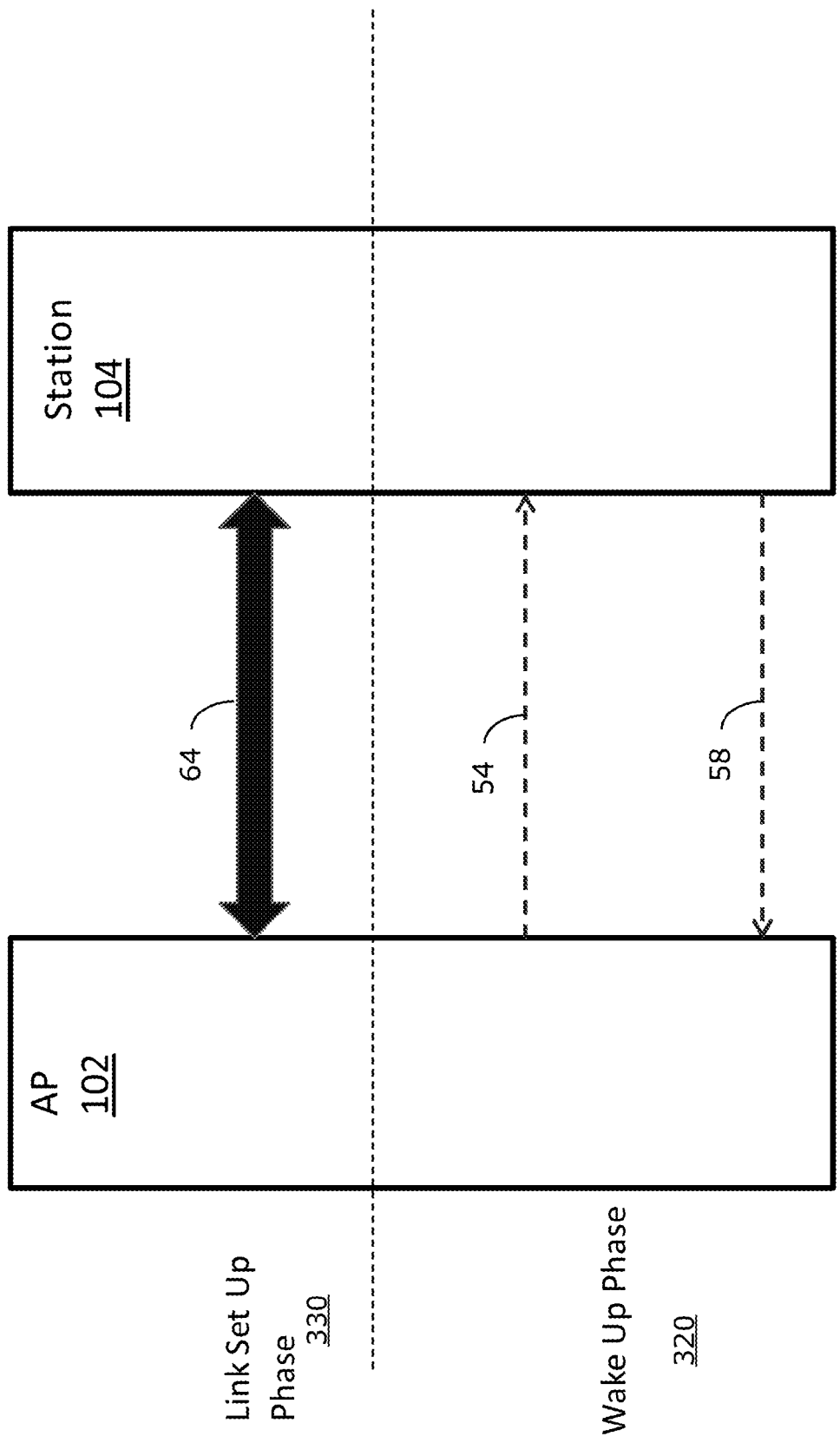
FIG. 3 illustrates example communications between an AP and a station.

FIG. 3 illustrates another example of how a AP 102 communicates a WUF 200 to the station 104. In this example, communications between the AP 102 and the station 104 have been conceptually divided into a link set up phase 330 and a wake-up phase 320. It should be noted that distinction between the two phases 320, 330 may be conceptual only and there may be overlap in signals and timing between these two conceptual phases 320, 330.

In the link set up phase 330, the AP 102 and the station 104 may communicate with each other at 64, in order to perform association and authentication (e.g., in accordance with IEEE 802.11 standard). After the station 104 is associated with the AP 102, a wake-up identifier (WUID) and optionally a wake-up key (WUK) are generated and managed by both the AP 102 and station 104. The WUID and WUK are described in further detail below.

In the wake-up phase 320, the AP 102 transmits the WUF 200 to the station 104 at 54. The WUF 200 may be encrypted, scrambled or left unencrypted and unscrambled, as discussed further below.

The station 104, after receiving the WUF 200, performs verification on the WUF 200, using security features disclosed herein and discussed in greater detail below. Such verification may include, for example, correlation of a PHY header (e.g., if present), verification of a frame sequence number, verification of a wake-up signal carried in the WUF 200 (e.g., whether the information is valid), verification of a recipient identifier (e.g., whether it matches the station's own identifier), or verification of an authentication tag (e.g., whether it is valid, if encryption is being used).

After verification is successful, the station 104 may optionally send an acknowledgement to the AP 102 at 58.

The WUR circuit 108 may be vulnerable to malicious attacks that interfere with or forge the communication of the WUF 200, for example. Such attacks may attempt to drain the resources (e.g., power) of the station 104 or obtain unauthorized information from the station 104, for example. Examples of such attacks include attacking the listening capabilities, identity theft, man-in-the-middle attacks, attacking the broadcast capabilities, and brute force attacks. Such attacks may be carried out using eavesdropping techniques, fake wake-up frames, key cloning or reusing old keys, or continuous transmission of wake-up frames or other data.

Example embodiments described herein may address one or more of these security concerns by introducing one or more security features to the WUF 200. Since the WUR circuit 108 is intended to be a low-power circuit, the security feature(s) should require the WUR circuit 108 to add only a small amount of time and power in detecting, decoding and verifying the WUF 200. The security feature(s) should enable the WUR circuit 108 to determine whether the source of the WUF 200 is a valid source (e.g., is from the associated AP 102). Where a key is used to encrypt or scramble the WUF 200, (discussed further below), a security mechanism should be provided to avoid excessive reuse of old keys. The security feature(s) should enable the WUR circuit 108 to be protected against brute force attacks.

In implementing various example security features discussed herein, the station 104 should first be appropriately associated with the AP 102, using appropriate association techniques. Such association may take place using any suitable techniques (e.g., per IEEE 802.11 standard), and takes place prior to the communications illustrated in FIG. 1. For example, this association may take place during the link set up phase 330 illustrated in FIG. 3. This may involve the AP 102 assigning an association identifier (AID) to the station 104. Where encryption is used, the station 104 should have a decryption key, obtained through appropriate authentication and association techniques (e.g., being assigned a key by the AP 102 or through mutual key generation, in accordance with IEEE 802.11). Where a key is used for scrambling (e.g., used as an initiation vector for a scrambling algorithm), a similar process may be used to generate and/or exchange keys between the AP 102 and the station 104. Each of the AP 102 and station 104 should manage its respective keys with appropriate security measures (e.g., regularly refreshing keys).

In examples discussed below, security features that may be used for ensuring secure transmission of the WUF 200 include a wake-up sequence, a WUID and optionally a WUK.

Figure 4:
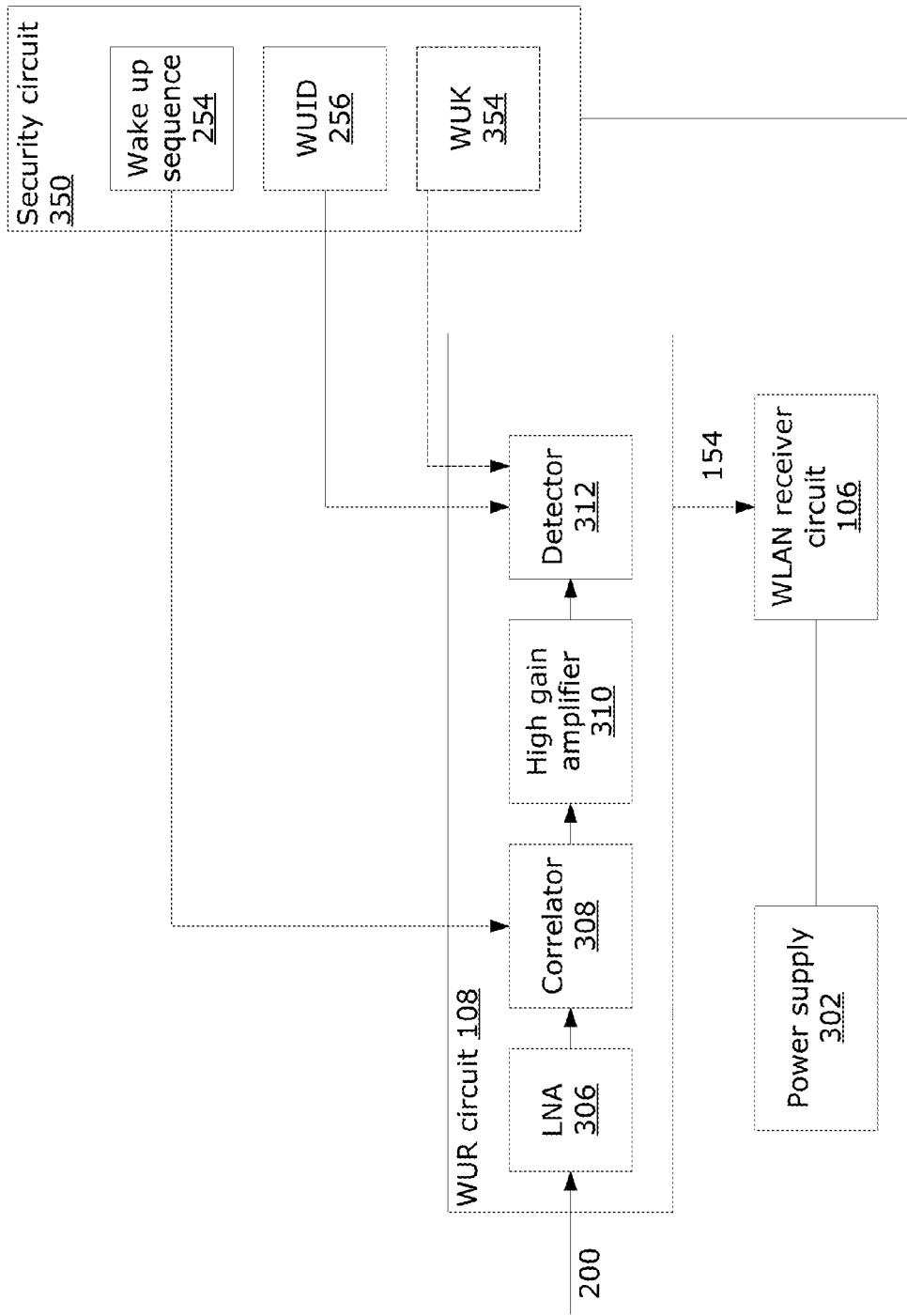
FIG. 4 is a block diagram illustrating communications between a wake-up receiver circuit and a security circuit in a station.

FIG. 4 illustrates how such security features may logically interact with the WUR circuit 108. FIG. 4 shows select details of circuitry that may be implemented in a station 104. In this example, a power supply 302 (e.g., battery circuit) provides power to the WLAN receiver circuit 106 and the WUR circuit 108, as well as a security circuit 350.

Certain details of the WUR circuit 108 are shown, including a low noise amplifier (LNA) 306, a correlator 308, a high gain amplifier 310, and a detector 312. Generally, the WUF 200 passes though these stages of the WUR circuit 108 before an internal signal 154 is generated and sent to the WLAN receiver circuit 106. The security circuit 350 may have more than one stage of security checks.

In the example shown, the security circuit 350 provides logic to generate a wake-up sequence 254, store a WUID 256 and optionally store a WUK 354. The security circuit 350 may also store other parameters for security operations (e.g., for encryption and decryption, or scrambling and unscrambling purposes). The WUK 354 may only be present where encryption is used for the WUF 200, or where the WUK 354 is used for scrambling. Where the WUF 200 is not encrypted or where the WUK 354 is not used for scrambling, the security circuit 350 may not store the WUK 354.

The wake-up sequence 254 may enable a security check to be carried out at the correlator stage 308 of the WUR circuit 108. At the correlator 308, the WUR circuit 108 may correlate a received wake-up sequence 254 decoded from the received WUF 200 with a local wake-up sequence 254 locally generated by the security circuit 350. Successful correlation indicates that the WUF 200 is valid (e.g., from a trusted source such as the associated AP 102) and that the receiving station 104 is the intended recipient. If this security check fails, the WUF 200 is not further propagated to the high gain amplifier 310.

The WUID 256 may enable a security check to be carried out at the detector stage 312 of the WUR circuit 108. The WUR circuit 108 may verify the authenticity of the WUID 256 to ensure the WUF 200 is not a malicious attack. If this security check fails, propagation of the internal signal 154 to the WLAN receiver circuit 106 may be prevented.

The WUK 354, if used, may enable a security check to be carried out at the detector stage 312 of the WUR circuit 108, for example by verifying an authentication tag. If this security check fails, propagation of the internal signal 154 may be prevented.

Figure 5:
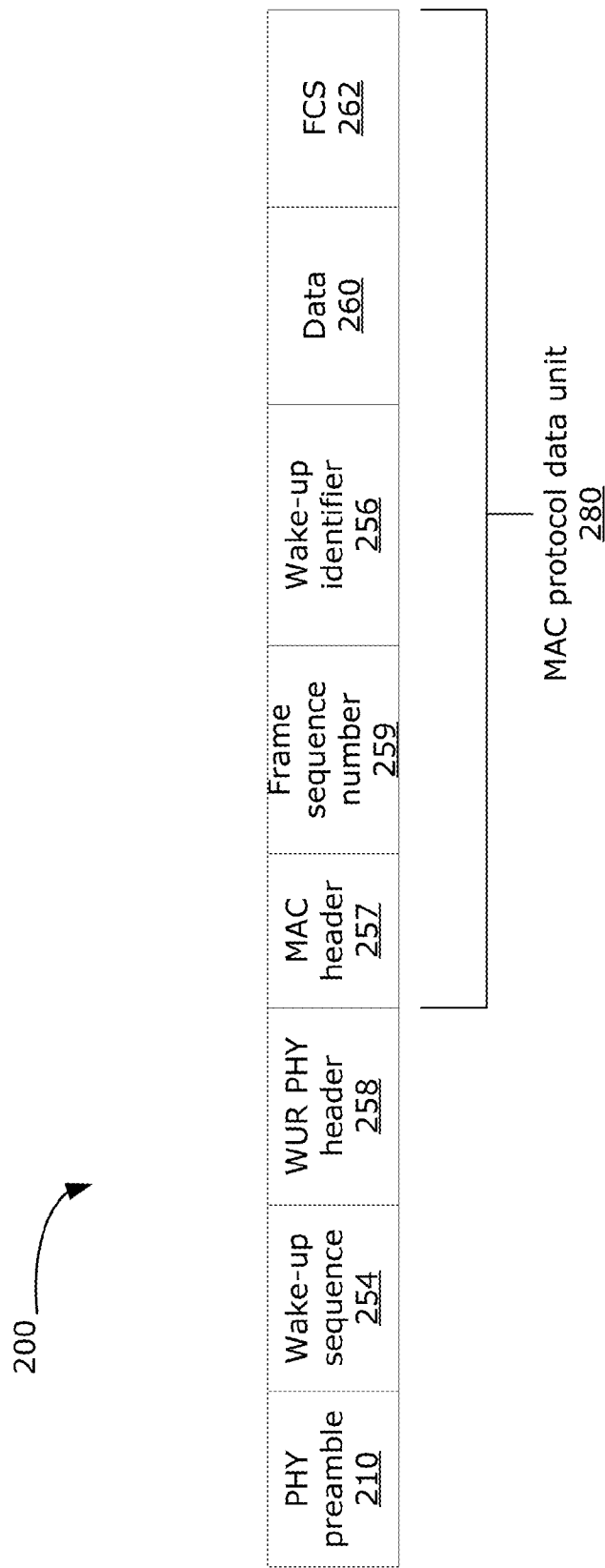
FIG. 5 illustrates an example frame format for a wake-up frame.

FIG. 5 shows an example format for a WUF 200. In the example of FIG. 5, the WUF 200 is not encrypted. The WUF 200 is transmitted within a physical protocol data unit (PPDU).

In the example shown, the WUF 200 includes a physical layer (PHY) preamble 210. The PHY preamble 210 may include a legacy preamble and short training field (STF) or long training field (LTF). The legacy preamble 210 is used for coexistence with other IEEE 802.11 devices, however in some examples the legacy preamble 210 may be omitted, for example as discussed in U.S. provisional patent application No. 62/362,410, titled "Frame Format and Design of Wake-Up Frame for a Wake-Up Receiver", filed Jul. 14, 2016. The PHY preamble 210 provides information for synchronization and channel estimation purposes. In some examples, the WUF 200 may omit the legacy preamble. Examples of the PHY preamble 210 for a WUF 200 are described in U.S. provisional patent application No. 62/362,410, noted above.

The example WUF 200 also includes a wake-up sequence 254. The wake-up sequence 254 contains a unique number specific to a specific station 104 or a specific group of stations 104 (in the case of a group wake-up sequence 254).

The example WUF 200 also includes a WUR PHY header 258. The WUR PHY header 258 includes information for detection of the subsequent data contained in the WUF 200.

The example WUF 200 also includes a MAC protocol data unit (MPDU) 280. The MPDU 280 in this example includes a MAC header 257. Examples of the MAC header 257 for a WUF 200 are described in U.S. provisional patent application No. 62/362,473, entitled "MAC Frame Design of Wake-Up Frame for Wake-Up Receiver", filed Jul. 14, 2016. The example MPDU 280 includes a frame sequence number 259, which may enable determination of whether the WUF 200 is a current or old WUF 200.

The MPDU 280 includes a WUID 256. The WUID 256 is used by the WUR circuit 108 to authenticate the WUF 200.

The example MPDU 280 may include data 260, for example controlling information for management of the WUR circuit 108.

The example MPDU 280 ends with a field check sequence (FCS) 262. The FCS 262 may be a relatively short sequence, for example using cyclic redundancy check (CRC)-8, CRC-12, or CRC-16.

As noted previously, the wake-up sequence 254 may be used by the station 104 to ensure that the received frame is indeed a WUF 200 and that it is intended for the station 104 (or group of stations 104). The wake-up sequence 254 may be positioned in the WUF 200 such that the wake-up sequence 254 is processed after completion of automatic gain control and channel synchronization, but before the MAC header 257. Generally, the wake-up sequence 254 may be inserted in any suitable portion within the PPDU in which the WUF 200 is transmitted. For example, the wake-up sequence 254 may be positioned in the WUF 200 prior to the MPDU 280. For example, the wake-up sequence 254 may be positioned between the PHY preamble 210 and the WUR PHY header 258, as shown in FIG. 5, or the wake-up sequence 254 may be included as part of the PHY preamble 210, or included as part of the WUR PHY header 258. Positioning of the wake-up sequence 254 early in the WUF 200 may enable early mitigation against a brute force attack, for example.

In the example shown, the wake-up sequence 254 is provided near the front of the WUF 200, in order to enable early detection and identification of the WUF 200. Decoding of the remainder of the WUF 200 is carried out by the WUR circuit 108 only if the wake-up sequence 254 is successfully verified. Early detection of the wake-up sequence 254 may enable the WUR circuit 108 to determine whether the WUF 200 is a valid wake-up signal and, if not, to ignore the remainder of the signal. This may help to mitigate waste of resources (e.g., power) in the case of a brute force attack, for example.

In the example of FIG. 5, the WUID 256 is shown positioned between the frame sequence number 259 and the data 260. The WUID 256 may be generally positioned in the MPDU 280, for example as part of the data portion 260.

Although the example of FIG. 5 is described above as being not encrypted, scrambling may be applied to the MPDU 280, for exampling using the WUID 256 as the initiation vector of a suitable scrambling algorithm.

Example methods for generating the wake-up sequence 254 are described below. The wake-up sequence 254 may be generated by the AP 102. For example, the AP 102 may assign a wake-up sequence 254 for a given station 104 or group of stations 104 (e.g., similarly to how the AP 102 assigns an AID to a station 104 and a group AID to a group of stations 104). Each constructed wake-up sequence 254 should correspond to a specific station 104 or, in the case of a group wake-up sequence 254 for a broadcast WUF 200, correspond to a specific group of stations 104. The sequences in a set of wake-up sequences 254 should have good autocorrelation and cross-correlation properties in order to enable auto-detection of valid wake-up signals, using autocorrelation of the wake-up sequence 254, by the station 104. It is desirable that the set of wake-up sequences 254 be a large set and the length of each wake-up sequence 254 to be short (to keep power low). For example, a sequence length of 32-bits may be sufficient for the desired correlation characteristics. An example suitable set of wake-up sequences 254 may be generated using the algorithm for generating a Gold sequence, as discussed further below. Generally, a set of Gold sequences can include a large number of Gold sequences with relatively good correlation properties Other sequences exhibiting desirable correlation properties include Zadoff-Chu sequences and zero-correlation zone (ZCZ) sequences, for example. After constructing the wake-up sequence 254, the AP 102 inserts the wake-up sequence 254 in the WUF 200.

As noted above, an example approach for generating a wake-up sequence 254 is based on the generation of a Gold sequence. First, the following discussion of correlation properties and algorithms is provided to help in understanding the generation of a wake-up sequence 254, based on Gold sequences.

Definitions of autocorrelation and cross-correlation of sequences are first provided. Sequences x and y of length N are denoted as $x=(x_0, x_1, \ldots x_{N-1})$ and $y=(y_0, y_1, \ldots, y_{N-1})$ where $x_i, y_j \in C$ (where C is the set of complex number). T denotes the operator which left-shifts the vectors one place cyclically as $Tx=(x_1, x_2, \ldots, x_{N-1}, x_0)$. To generalize the shift operation, the denotation $T^k x=(x_k, x_{k+1}, \ldots, x_{N-1}, x_0, x_1, \ldots, x_{k-1})$ is used for $0 \leq k < N$.

Periodic cross-correlation is denoted as $$A_{x,y}(l) = \sum_{i=0}^{N-1} x_i y^*_{(i+1) \bmod N}, l \in Z.$$

Periodic autocorrelation is denoted as $$A_x(l) = \sum_{i=0}^{N-1} x_i x^*_{(i+1) \bmod N}, l \in Z.$$

Figure 9:
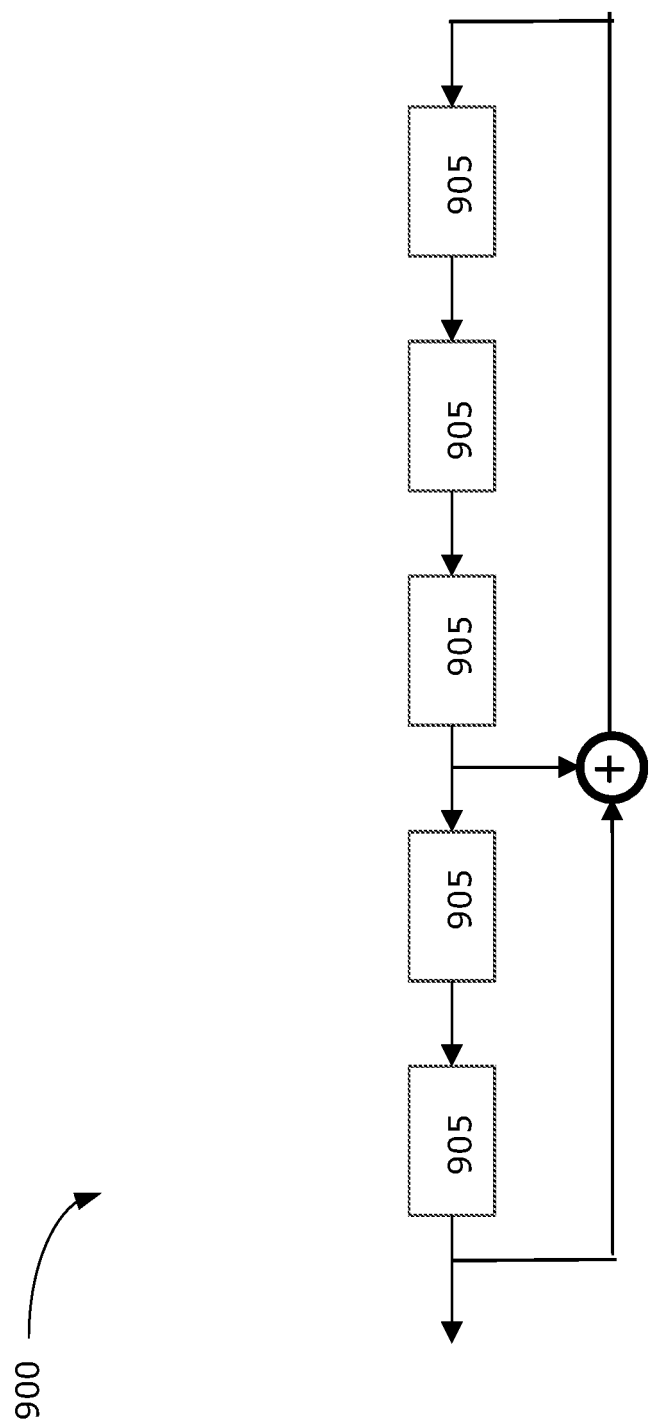
FIG. 9 is a block diagram illustrating an example maximal-length linear feedback shift register.

A binary maximal-length sequence (referred to as a m-sequence) is a sequence of length N, which is generated by a shift register with primitive binary polynomial h(t) of degree of n and has maximal period of $N = 2^n - 1$. For example, a maximal-length linear feedback shift register with n=5 is $h(t)=t^5+t^2+1$ (equivalent to binary code 100101, octal representation 45), which may be represented as a shift register 900 having five stages 905, as shown in FIG. 9.

Some properties of m-sequences are as follows (where sequence u below is an m-sequence). Firstly, the period of u is $N=2^n-1$. Secondly, there are exact N nonzero sequences generated by h(t), specifically: $u, Tu, T^2u, \ldots, T^{N-1}u$. Thirdly, autocorrelation of u is:

$$A_u(l) = \begin{cases} N, & \text{if } l \equiv 0 \bmod N \\ -1, & \text{if } l \not\equiv 0 \bmod N \end{cases},$$

which demonstrates very good autocorrelation. Fourthly, where q denotes a positive integer, a sequence v is formed by taking every qth bit of u (i.e., $v_i=u_{qi \bmod N}$) and is denoted as u[q]. v=u[q] has a period of N if and only if gcd(N,q)=1. In general, there are only a few m-sequences with very good autocorrelation and cross-correlation properties. Typically, large sets of m-sequences have poor cross-correlation properties.

Gold sequences form a class of periodic sequences providing large sets of sequences with good periodic cross-correlation. A set of Gold sequences can be constructed based on selected m-sequences. Consider $t(n)=1+2^{\lfloor (n-2)/2 \rfloor}$ where n is the degree of polynomial. Let v=u[t(n)] A set of Gold sequences is then constructed as $G(u,v)=\{u,v,u \oplus v, u \oplus Tv, \ldots, uT^{N-1}v\}$. Cross-correlations of Gold sequences take three values $\{-1, -t(n), t(n)-2\}$. Therefore, the peak autocorrelation and cross-correlation value is t(n) for n mod $4 \neq 0$. Some parameters and results of example Gold sequences are shown in the following table:

| N | Polynomial | Number of Gold sequence | Correlations |
|---|---|---|---|
| 31 | 3551 | 33 | 7 −1 −9 |
| 63 | 14551 | 65 | 15 −1 17 |
| 127 | 41567 | 129 | 15 −1 17 |

As noted above, a wake-up sequence 254 may be assigned by the AP 102 to a station 104 (or group of stations 104, in the case of a group wake-up sequence 254). For simplicity, the following discussion will refer to a wake-up sequence 254 for a single station 104, though it should be understood that the process for generating and assigning a group wake-up sequence 254 to a group of stations 104 is similar. FIGS. 10A and 10B are flowcharts illustrating example methods 1000, 1050 of the generation and use of the wake-up sequence 254 by the the AP 102 and station 104.

Prior to the steps depicted in FIGS. 10A, and 10B, the AP 102 generates an m-sequence u from the shift register with a given predefined polynomial and a predefined initial state. The m-sequence u is stored at both the AP 102 and the station 104. From the m-sequence u, the preferred m-sequence v is generated as v=u[t(n)].

From the generated sequences u and v, and a shift operator T, a Gold sequence G(u,v) can be defined, as discussed above. In this case, the shift operator T is defined based on the identifier of the station 104 (e.g., all or a portion of the AID, MAC address or WUID 256). For example, where the AID is 00001, this may define a shift by 1; and where the AID is 01111, this may define a shift by 15. A Gold sequence generated based on the identifier of a specific station 104, together with a potential cyclic prefix (by appending an end portion of the Gold sequence to the front of the Gold sequence) and a potential cyclic postfix (by appending a beginning portion of the Gold sequence to the end of the Gold sequence), can then be assigned as the wake-up sequence 254 for that specific station 104. The AP 102 may inform the station 104 (e.g., during the link set up phase) of the length of the identifier that should be used to generate the wake-up sequence 254.

Since both the AP 102 and the station 104 know the station's identifier (e.g., WUID 256, MAC address or AID), the AP 102 and the station 104 can each independently generate the wake-up sequence 254 as needed (e.g., when the AP 102 needs to insert the wake-up sequence 254 into a WUF 200, or when the station 104 needs to use the wake-up sequence 254 to perform autocorrelation on a received WUF 200) and do not need to store the entire wake-up sequence 254 in memory at the AP 102 and station 104. This may help to conserve memory usage at the AP 102 and the station 104.

At 1005, the AP 102 determines the identifier of the target station 104 to which the WUF 200 is to be sent. Using the identifier (e.g., using the identifier to define the shift operation T for a Gold sequence), a wake-up sequence is generated at 1010. At 1015, the AP 102 generates the WUF 200, including the generated wake-up sequence 254 inserted, for example ahead of the MPDU 280. Optionally, at 1020, the AP 102 may encrypt or scramble the WUF 200. For example, the WUF 200 may be encrypted using a WUK 354, or the WUF 200 may be scrambled using any suitable scrambling algorithm (e.g., using a WUK 354 or WUID 256 as the initiation vector of the scrambling algorithm). The AP 102 then transmits the WUF 200 at 1025.

At 1055, the receiving station 104 receives the WUF 200. The PHY preamble 210 is decoded and used for synchronization. At 1060, the received wake-up sequence 254 is then decoded. At 1065, the station 104 generates a local wake-up sequence 254 (e.g., at the security circuit 350). At 1070, the WUR circuit 108 performs correlation operations between the received wake-up sequence 254 in the received WUF 200 and the local wake-up sequence 254. Based on the result of the correlations, the WUR circuit 108 determines whether the received wake-up sequence 254 is the wake-up sequence 254 assigned to the station 104. If correlation is successful, indicating that the received wake-up sequence 254 matches the station's assigned wake-up sequence 254, then the WUR circuit 108 will continue decoding the WUF 200 at 1075, proceeding to detection of the WUR PHY Header 258. Otherwise, the WUF 200 is discarded.

Although the above process is described using Gold sequences as the basis for generating wake-up sequences, a similar process may be carried out using other classes of sequences that exhibit desirable correlation characteristics (e.g., good autocorrelation). For example, a similar process may be used to generate wake-up sequences 254 based on Zadoff-Chu sequences of ZCZ sequences, as well as sequences that are not m-sequences.

An example method for generating the WUID 256 may be used where keys are used for encryption or scrambling between the AP 102 and station 104. The WUF 200 may be encrypted or scrambled for greater security. In this case, a WUK 354 has been generated and shared between the AP 102 and station 104 for encryption or scrambling purposes (e.g., using a suitable key derivation function and based on a master key at the AP 102). Set up of the key may be carried out during the link set up phase 330 (see FIG. 3) described above. The WUK 354 may be used to encrypt or scramble the WUF 200. The WUK 354 or a portion of the WUK 354 may be inserted into the WUF 200 as the WUID 256. A hash function may be applied to the WUK 354 or portion of WUK 354 in order to generate the WUID 256.

Where there is no WUK 354 shared between the AP 102 and the station 104, the WUID 256 may be any suitable authentication information securely exchanged between or mutually generated by the AP 102 and the station 104.

The WUID 256 is used by the WUR circuit 108, using appropriate authentication methods (e.g., using bit-wise checking), to authenticate the WUF 200. Where the WUK 354 is the basis of the WUID 256, a station 104 may detect that it is the intended recipient of a WUF 200 by recognizing its own WUK 354 in the WUF 200.

As noted above, it is desirable to protect against malicious attacks that reuse or clone an old WUF 200. Protection against such an attack may be referred to as freshness protection. An example approach is for the WUR circuit 108 to verify that the frame sequence number 259 is higher than the frame sequence number 259 of a previous WUF 200. This approach requires the AP 102 to increment the frame sequence number 259 by at least one for each new WUF 200 being sent. The WUF 200 will be accepted by the WUR circuit 108 as a valid communication only if the value of the frame sequence number 259 is greater than the value of the frame sequence number 259 of a previously accepted WUF 200.

Figure 6:
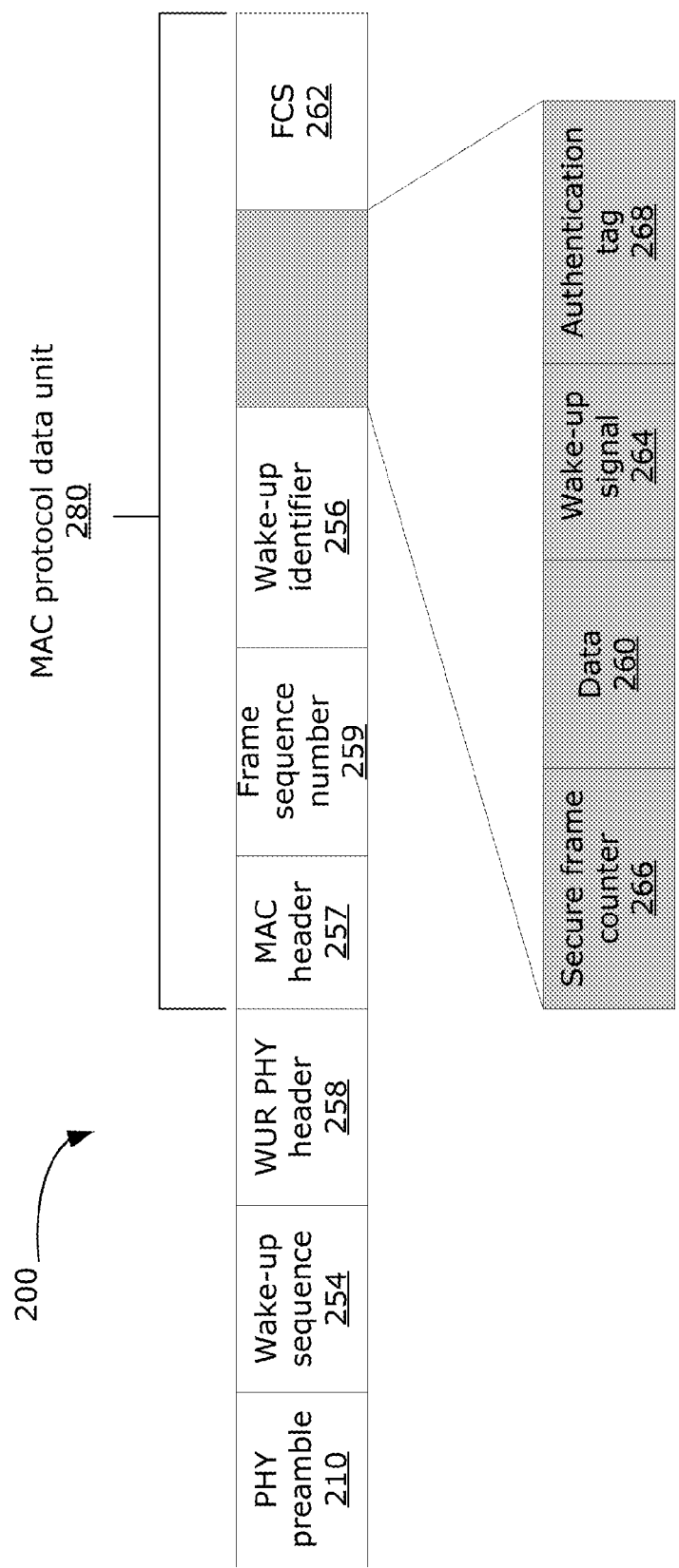
FIG. 6 illustrates another example frame format for a wake-up frame.

Encryption or scrambling may be applied to portions of the WUF 200 following the WUR PHY header 258. FIG. 6 illustrates an example WUF 200 with encryption. FIG. 6 is similar to FIG. 5, however in FIG. 6, encrypted portions are denoted in gray. As shown in FIG. 6, encrypted portions of the WUF 200 may include a secure frame counter 266, the data portion 260, the wake-up signal 264 (which in some cases may be considered part of the data portion 260) and an authentication tag 268. An example encryption method is to use the WUK 354 as an input into an encryption method, such as AES-CCM or other suitable method, together with the MAC address and frame sequence number 259 of the WUF 200. The station identifier (e.g., AID or MAC address) may be used as the initialization vector (IV) of the AES-CCM. The result is then the encrypted WUF 200 with an authentication tag 268. Although FIG. 6 includes the WUID 256 in the encrypted WUF 200, in some examples the encrypted WUF 200 may omit the WUID 256, since encryption using the WUK 354 may be expected to provide sufficient authentication without the WUID 256.

Where the WUF 200 is encrypted, further freshness protection may be provided using the secure frame counter 266. The secure frame counter may be an input for encryption 266 (e.g., using advanced encryption standard (AES)) by the AP 102. The secure frame counter 266 is incremented by at least one for each new encrypted frame using a given WUK 354. When the WUK 354 is updated, the secure frame counter 266 is reset to one. The WUF 200 will be accepted by the WUR circuit 108 as a valid communication only if the value of the secure frame counter 266 is greater than the secure frame counter 266 contained in the last accepted frame secured using the same WUK 354. This freshness verification using the secure frame counter 266 may be carried out in addition to freshness verification using the frame sequence number 259, as described above, for additional security.

Where encryption is used, verification of the authentication tag 268 (or integrity code) by the WUR circuit 108 may provide another layer of security.

Where encryption is used, encryption may be using the cipher engine under IEEE 802.11, in which case the MAC header 257 would not be encrypted but the data portion of the MPDU 280 would be encrypted. If scrambling is used, the entire MPDU 280 may be scrambled.

As noted previously, the WUID 256 may be generated based on the WUK 354. In order to provide greater freshness protection, the WUK 354 may be managed by a MAC entity and refreshed at certain time intervals. For example, the WUK 354 may be refreshed in the event of an initial or subsequent authentication or association request or response between the AP 102 and station 104. This ensures that the WUID 256 is similarly refreshed. The WUK 354 may also be refreshed in the event of an event trigger (e.g., re-authentication or dis-authentication event) or in the event of a timeout trigger (e.g., exceeding the time duration of a preset timeout). Notably, the same WUK 354 may be used for transmission of a plurality of WUFs 200, within the lifespan of the same WUK 354. Since the WUID 256 may be generated based on the WUK 354, for greater robustness a new WUID 256 may be generated for each new WUF 200, even within the lifespan of the same WUK 354. This may be carried out using the chaining mode, for example as illustrated in FIG. 7.

Figure 7:
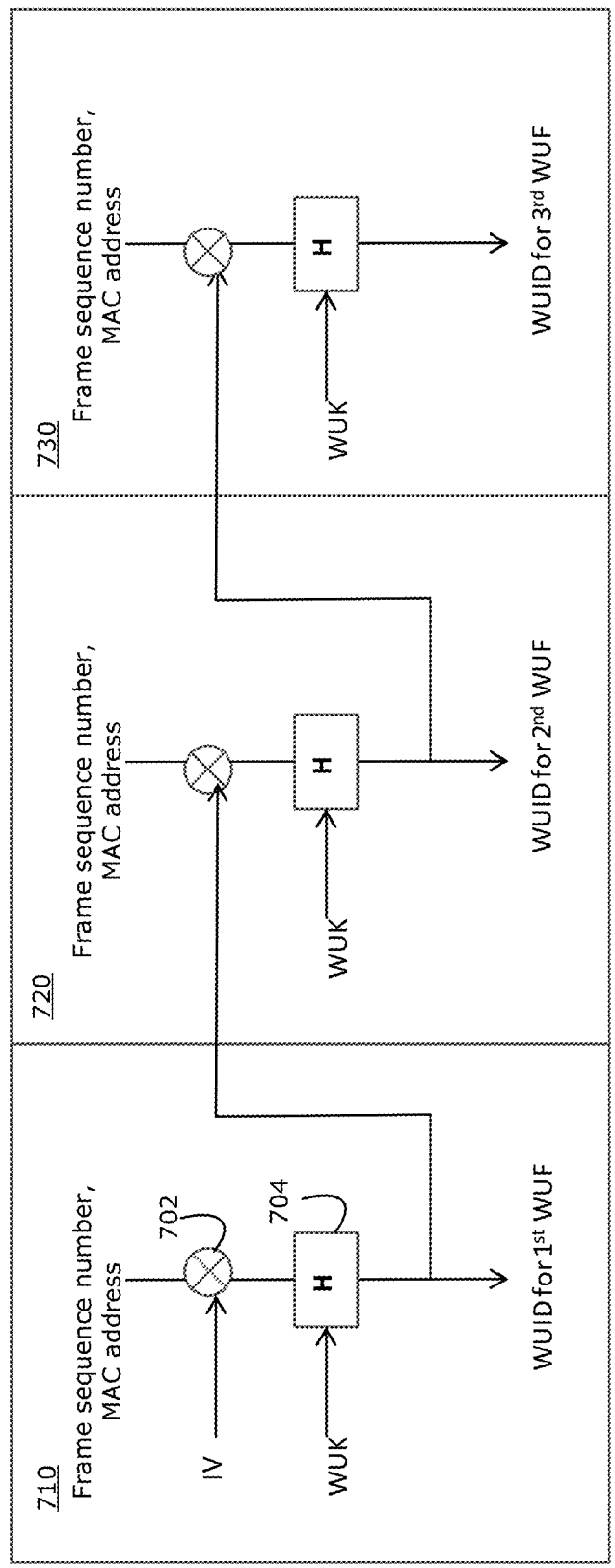
FIG. 7 illustrates an example of how chaining may be used for generation of multiple wake-up identifiers during the lifespan of a single wake-up key.

FIG. 7 illustrates an example of how three instances of WUID generation may be chained together to generate three different WUIDs 256 for three different WUFs 200 using the same WUK 354. For the first generation 710, the WUK 354 has not been previously used to generate a WUID 256. The frame sequence number 259 and MAC address are provided as input into an encryptor 702 (e.g., AES-CCM) together with an IV (e.g., a station identifier such as the AID or MAC address). The WUK 354 is also provided as input into a hash function 704. The result is used as the WUID 256 for the first WUF 200. A second and third WUF 200 may be transmitted during the lifespan of the same WUK 354. In the second generation 720, the previously generated WUID 256 is provided as input into the encryptor 702 instead of the IV, while the same WUK 354 is used. The second WUID 256 is then similarly generated for the second WUF 200. A similar chaining process may be used for the third generation 730 to generate a third WUID 256 for the third WUF 200. This chaining process ensures that the WUID 256 is newly generated for each WUF 200 without having to refresh the WUK 354. This may provide additional robustness against identity theft, man-in-the-middle attacks and attacks on broadcast capabilities, for example. A similar process may be carried out where a scrambling algorithm is used instead of encryption.

Figure 8:
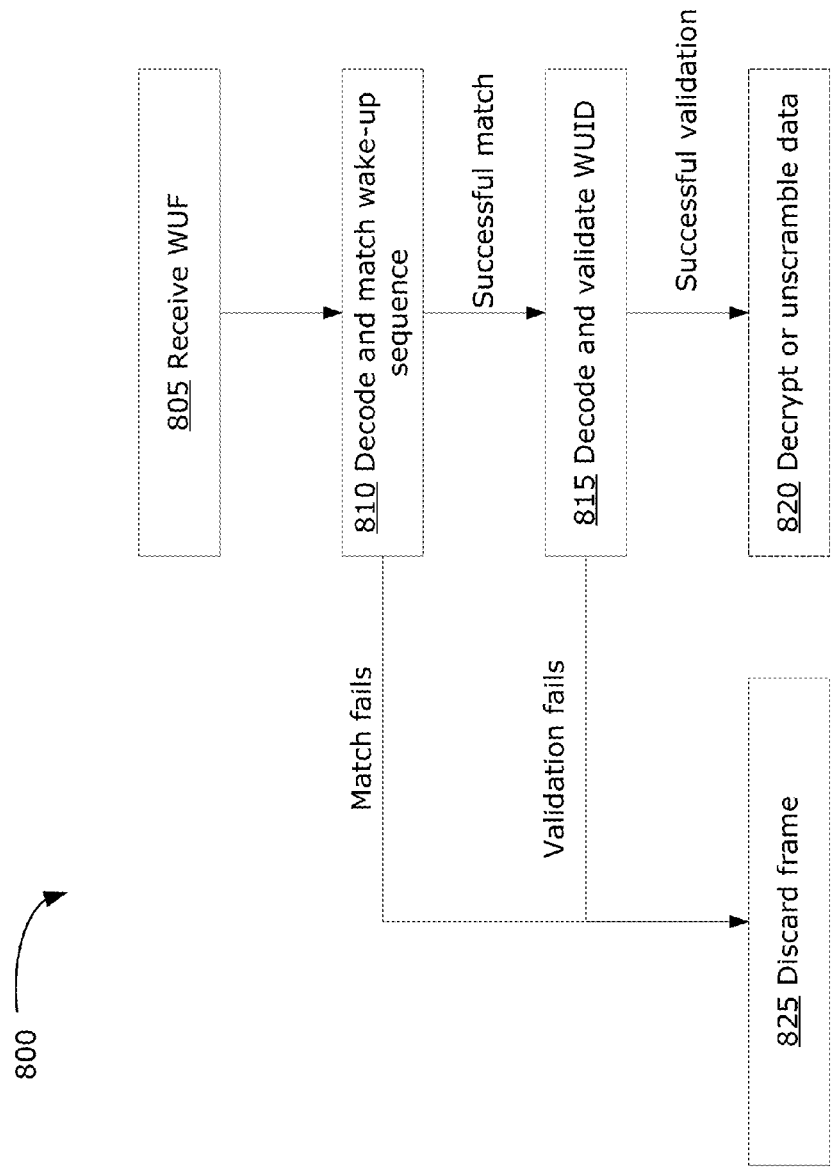
FIG. 8 is a flowchart illustrating an example method for validating a received wake-up frame at a wake-up receiver circuit.

FIG. 8 is a flowchart illustrating an example method 800 of how the wake-up sequence 254 and WUID 256 may be used for security at the WUR circuit 108. Although FIG. 8 is described with respect to WUR circuit 108 at a single station 104, it should be understood that a similar process may be performed by multiple stations 104 receiving a broadcast WUF 200.

At 805, the WUR circuit 108 of the receiving station 104 receives the WUF 200 from the AP 102.

At 810, the WUR circuit 108 begins decoding the WUF 200. Upon reaching the wake-up sequence 254, the WUR circuit 108 decodes the wake-up sequence 254 and attempts to match the wake-up sequence 254 (e.g., using correlation) to determine whether the received frame is indeed a WUF 200 and whether the station 104 is the intended recipient. If the match fails (e.g., the frame is not a WUF 200 and/or the station 104 is not the intended recipient), the received frame is discarded at 825. By positioning the wake-up sequence 254 early in the WUF 200 (e.g., included in the PHY preamble 210 or immediately following the PHY preamble 210), this enables the WUR circuit 108 to make an early determination of whether or not to discard the frame, thus potentially mitigating the negative effects of a brute force attack, for example.

If the match is successful, then at 815 the WUR circuit 108 continues decoding the WUF 200, reaching the portion containing the WUID 256. The WUID 256 is validated (e.g., in accordance with IEEE 802.11 mutual authentication techniques). If validation fails, the frame is discarded at 825.

If validation is successful, then the remainder of the WUF 200, including the data portion 260, is decoded. Where the WUF 200 is encrypted or scrambled, the data portion 260 may be decrypted (e.g., using a mutually generally WUK 354) or unscrambled at 820. In some examples, where the WUF 200 is encrypted, additional validation may be performed using the authentication tag 268.

Although encryption or scrambling of the WUF 200 is described in some examples, use of encryption or scrambling may require greater use of power resources. For example, use a dedicated and always-on encryption/decryption circuit in the station 104 may be necessary. Use of the wake-up sequence 254 and WUID 256 as security features may be sufficient to provide the desired level of security, without incurring the resource costs of encryption or scrambling.

Although some examples provided above describe operations between a AP and a single station, it should be understood that similar operations may be carried out between a AP and a group of stations, for example by using a group address, group identifier and a group key.

Although the present disclosure describes methods and processes with steps in a certain order, one or more steps of the methods and processes may be omitted or altered as appropriate. One or more steps may take place in an order other than that in which they are described, as appropriate.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, while the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method of waking up an electronic device (ED) having a wake-up receiver circuit, the method comprising:
   transmitting a signal comprising a wake-up frame (WUF) within a physical protocol data unit (PPDU);
   wherein the WUF includes a wake-up sequence inserted in a portion within the PPDU, the wake-up sequence encoding information for detection that the WUF is intended to wake up the ED and for determination of at least one intended recipient device;
   wherein the WUF further includes a wake-up identifier (WUID) in a data portion following the wake-up sequence, the WUID being separate from the wake-up sequence, the WUID encoding information for authenticating the WUF; and
   wherein the wake-up sequence is generated using at least a portion of a device identifier of the intended recipient device as input for a sequence generation algorithm, the sequence generation algorithm being selected to generate sequences having good autocorrelation properties.

2. The method of claim 1, wherein the WUF includes a physical layer preamble (PHY preamble), and the wake-up sequence is inserted in the PHY preamble.

3. The method of claim 1, wherein the WUF includes a physical layer preamble (PHY preamble) and a physical layer header (PHY header), and the wake-up sequence is inserted between the PHY preamble and the PHY header.

4. The method of claim 1 wherein the information encoded in the WUID further is for identifying the at least one intended recipient device.

5. The method of claim 1 wherein the sequence generation algorithm is for generation of a Gold sequence.

6. The method of claim 5 wherein the at least the portion of the device identifier is used to define a shift operator for generation of the Gold sequence.

7. The method of claim 1 wherein the WUID is generated by a source of the WUF based on a wake-up key (WUK) shared between the source and the at least one intended recipient device.

8. The method of claim 7 further comprising:
after transmitting a first WUF with a first WUID generated using the WUK, using the first WUID and the same WUK to generate a second WUID for a second WUF.

9. The method of claim 1 wherein the WUID is assigned to the at least one intended recipient device by a source of the WUF.

10. The method of claim 1 further comprising:
encrypting at least a data portion of the WUF using a wake-up key (WUK) before transmitting the signal comprising the WUF;
wherein the WUK is shared between a source of the WUF and the at least one intended recipient device.

11. The method of claim 1 further comprising:
scrambling at least a data portion of the WUF using a wake-up key (WUK) or using the WUID, before transmitting the signal comprising the WUF.

12. An apparatus comprising a processing configured to execute machine-executable instructions to cause the apparatus to:
transmit a signal comprising a wake-up frame (WUF) within a physical protocol data unit (PPDU);
wherein the WUF includes a wake-up sequence inserted in a portion within the PPDU, the wake-up sequence encoding information for detection that the WUF is intended to wake up the ED and for determination of at least one intended recipient device;
wherein the WUF further includes a wake-up identifier (WUID) in a data portion following the wake-up sequence, the WUID being separate from the wake-up sequence, the WUID encoding information for authenticating the WUF; and
wherein the wake-up sequence is generated using at least a portion of a device identifier of the intended recipient device as input for a sequence generation algorithm, the sequence generation algorithm being selected to generate sequences having mod autocorrelation properties.

13. The apparatus of claim 12, wherein the WUF includes a physical layer preamble (PHY preamble), and the wake-up sequence is inserted in the PHY preamble.

14. The apparatus of claim 12, wherein the WUF includes a physical layer preamble (PHY preamble) and a physical layer header (PHY header), and the wake-up sequence is inserted between the PHY preamble and the PHY header.

15. The apparatus of claim 12, wherein the information encoded in the WUID further is for identifying the at least one intended recipient device.

16. The apparatus of claim 12, wherein the sequence generation algorithm is for generation of a Gold sequence, and wherein the at least the portion of the device identifier is used to define a shift operator for generation of the Gold sequence.

17. The apparatus of claim 12, wherein the WUID is generated by the apparatus based on a wake-up key (WUK) shared between the apparatus and the at least one intended recipient device.

18. The apparatus of claim 17, wherein the processing device is further configured to execute instructions to cause the apparatus to:
after transmitting a first WUF with a first WUID generated using the WUK, use the first WUID and the same WUK to generate a second WUID for a second WUF.

19. The apparatus of claim 12, wherein the processing device is further configured to execute instructions to cause the apparatus to:
encrypt at least a data portion of the WUF using a wake-up key (WUK) before transmitting the signal comprising the WUF;
wherein the WUK is shared between a source of the WUF and the at least one intended recipient device.

20. The apparatus of claim 12, wherein the processing device is further configured to execute instructions to cause the apparatus to:
scramble at least a data portion of the WUF using a wake-up key (WUK) or using the WUID, before transmitting the signal comprising the WUF.

* * * * *